United States Patent [19]

Cervinka

[11] 4,034,953

[45] July 12, 1977

[54] MOLD FOR BOOT

[76] Inventor: Anthony G. Cervinka, 12 Fairview Cres., Trenton, Canada

[21] Appl. No.: 701,961

[22] Filed: July 1, 1976

Related U.S. Application Data

[63] Continuation of Ser. No. 657,831, Feb. 13, 1976, abandoned.

[51] Int. Cl.² .................. B29C 11/00; B19H 5/12
[52] U.S. Cl. ........................ 249/117; 249/137; 425/117; 425/129 S; 425/429
[58] Field of Search ............ 425/117, 119, 129 S, 425/429; 12/133 R, 142 EV; 249/117, 137

[56] References Cited

U.S. PATENT DOCUMENTS

| 228,664 | 6/1880 | Miller | 12/133 R |
| 1,991,386 | 2/1935 | Gerencser | 12/133 R |
| 2,761,159 | 9/1956 | Hollier et al. | 12/133 R |

FOREIGN PATENT DOCUMENTS

| 617,365 | 3/1936 | Germany | 12/142 EV |
| 296,686 | 3/1932 | Italy | 425/119 |

Primary Examiner—J. Howard Flint, Jr.

[57] ABSTRACT

A mold for use in the slush molding of boots with eyelets includes a pair of narrow, elongated grooves on its interior surface at the front side edges of the mold for forming relatively strong, one-piece, single thickness eyelet stays. The mold is in the form of a boot-shaped shell for receiving heat-curable plastisol, and forming a skin including one-piece eyelet stays.

1 Claim, 4 Drawing Figures

MOLD FOR BOOT

This application is a continuation of application Ser. No. 657,831, filed Feb. 13, 1976, and now abandoned.

This invention relates to a boot mold, and in particular to a mold for slushing a boot.

As described, for example, in Canadian Pat. No. 592,262 issued to A. Cervinka on Feb. 9, 1960, calf-length boots are produced by a slush moldng process in which a mold in the shape of the boot is filled with plastisol, e.g., polyvinyl chloride, the mold is heated to cause the plastisol to gel and form a skin, excess plastisol is poured from the mold, and the mold is again heated to cure the plastisol.

When applying the above process to the molding of shorter boots, i.e., boots of ankle or slightly above the ankle length, the steps are the same. However, attempts to produce a slush molded boot with eyelet stays for receiving metal lace eyelets have met with marginal success. In accordance with one such attempt, the front side of the mold was provided with a pair of wide projections, which appear as wide grooves in the inner surface of the mold for receiving plastisol. The resulting boot skin has excess material on each side at the front thereof for folding together to form double thickness eyelet stays.

Problems with double thickness eyelet stays are that they require a large excess of plastisol, and the resulting skin is relatively weak. When the eyelet stays are formed with separate sides and a liner is inserted in the skin because of the excess material, it is difficult to draw the the sides of the eyelet stays together and insert the eyelets. Moreover, the eyelet stays are relatively weak, since the two sides can tear separately.

The object of the invention is to avoid or overcome the above problems by providing a mold for slush molding a boot with one-piece eyelet stays, whereby the quantity of plastisol used in the boot skin is relatively small, and the eyelet stays are as strong as possible for the material used in the skin.

Accordingly, the present invention relates to a mold for slush molding a boot with eyelet stays including a boot-shaped shell, and a narrow, elongated groove in the front surface of the interior surface of the shell on each side of the longitudinal center thereof for receiving plastisol during molding to form a single thickness eyelet stay.

The invention will now be described in greater detail with reference to the accompanying drawings, which illustrate a preferred embodiment of the invention, and wherein.

Figure 1:
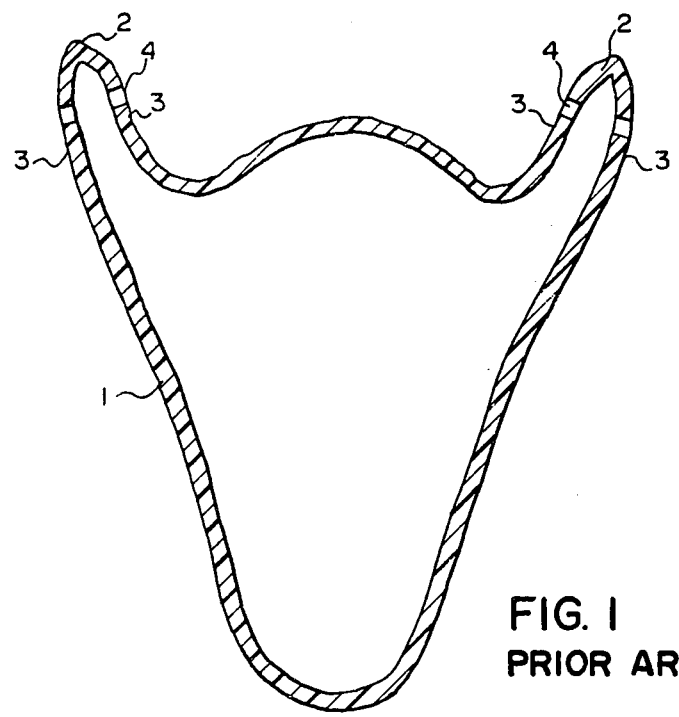
FIG. 1 is a cross-sectional view of a plastisol skin for a boot with eyelet stays produced in accordance with the prior art method discussed hereinbefore.

With reference to FIG. 1 of the drawings, in accordance with the prior art method of molding referred to hereinbefore, a boot skin 1 is molded with projections 2 on the front sides thereof. After insertion of a liner (not shown), sides 3 of each of the projections are compressed together to form eyelet stays and eyelets (not shown) are inserted through holes punched in the eyelet stays. It is readily apparent that the problems can be encountered in compressing the sides together, and that the sides 3 of the stays can tear separately.

The mold of the present invention overcomes the above problems by providing for the molding of a boot skin 5 having one-piece eyelet stays 6 projecting forwardly from each of the sides thereof. The stays 6 can readily be folded over the front central portion 7 of the boot upper. Moreover, because of the single thickness of material in the eyelet stays 6, tearing of the stays in the area of eyelet holes 8 is unlikely.

Figure 3:
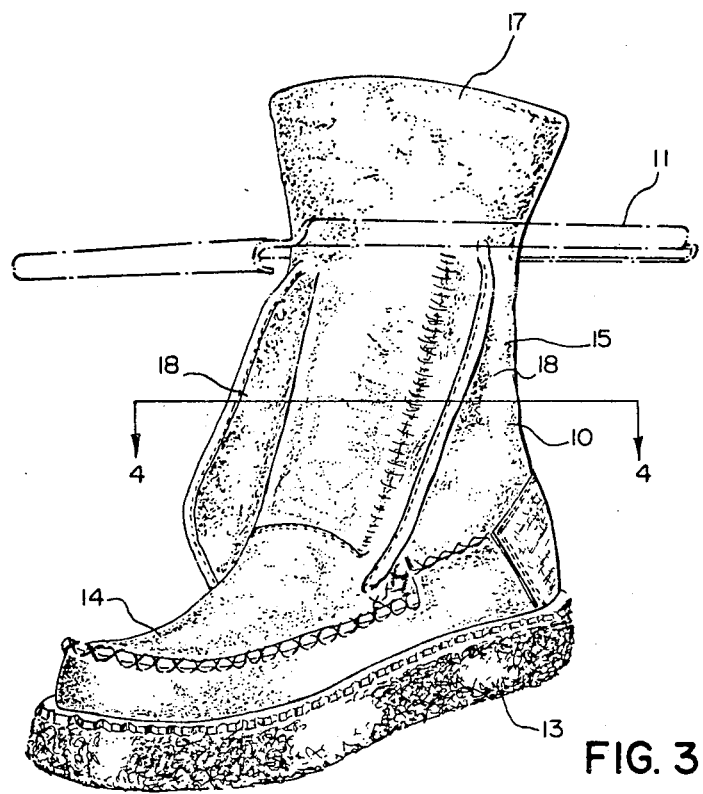
FIG. 3 is a perspective view of the mold of the present invention.
Figure 4:
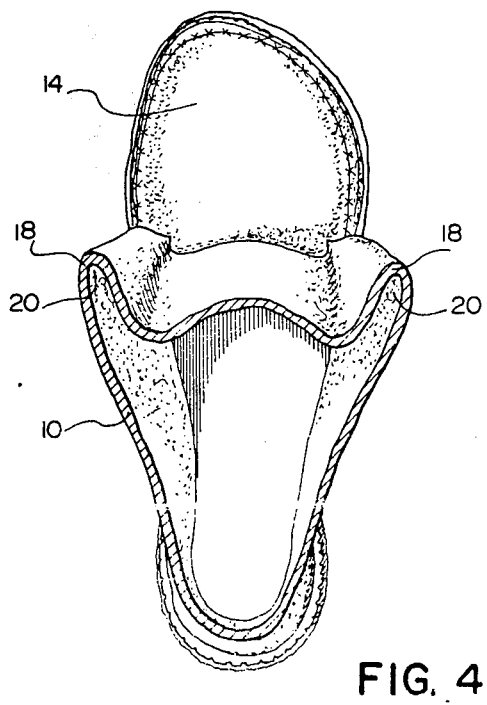
FIG. 4 is a cross-sectional view taken generally along the line 4—4 of FIG. 3.

Referring now to FIGS. 3 and 4 of the drawings, a mold 10 in accordance with the present invention is mounted in a rectangular frame 11 for connecting the mold to a mold carrier (not shown), which is mounted on a continuous conveyor of the type disclosed in applicant's co-pendng Canadian Pat. application Ser. No. 167,591, filed Mar. 30, 1973 (corresponding U.S. application No. 453,161 now U.S. Pat. No. 3,880,562). Since the conveyor and mold carrier do not form part of the present invention, no detailed description of such elements is necessary, except to mention that the conveyor and a plurality of carriers are used to move molds through the cycle referred to hereinbefore, namely mold filling, heating to form a skin; discharging of excess plastisol and curing with heat.

Figure 2:
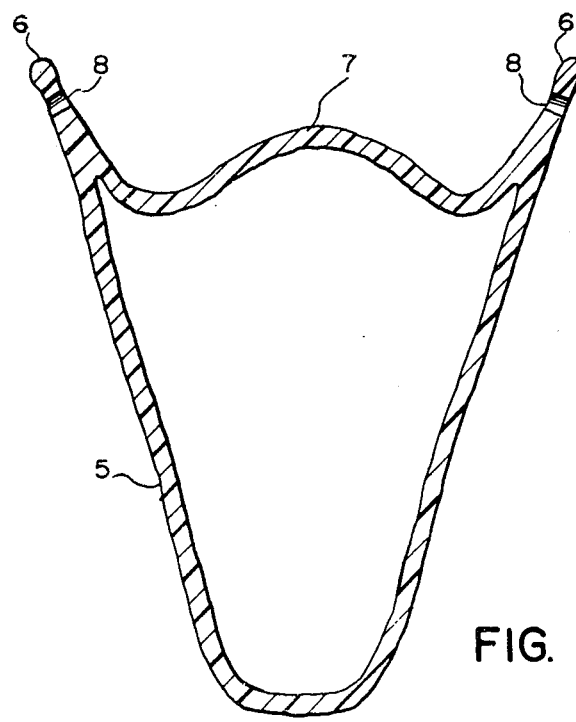
FIG. 2 is a cross-sectional view of a boot skin produced with the mold of the present invention.

The mold 10 itself is boot-shaped, includng a shell defining a sole portion 13 and an upper portion 14. The upper portion 14 is provided with a generally cylindrical ankle and leg forming sleeve 15, with a slightly flaring open top end 17 for receiving plastisol. An elongated projection 18 extends outwardly from each side of the front of the sleeve 15, the projection defining an elongated groove or recess 20 on each side of the interior of the mold for forming the eyelet stays 6 (FIG. 2).

In use, the mold 10 is filled with plastisol and is heated to form a boot skin 5, with solid, one-piece eyelet stays 6. Following formation of the skin, excess plastisol is poured out of the mold, and the skin left behind is cured, if necessary, reinforced and finally removed from the mold for finishing. By finishing is meant the lining and trimming of the skin, and the insertion of eyelets in the stays 6.

The embodiments of the invention in which an exclusive property or privilege is claimed are defined as follows:

1. A mold for use in the slush molding of a boot with eyelet stays, comprising a shell mold defining a hollow boot-shaped cavity for receiving heat-curable plastisol having an interior surface comprising a front upper portion with a longitudinal centerline, and means for forming single thickness eyelet stays comprising two narrow, elongated grooves in said front upper portion in spaced apart relationship, one on each side of and collateral with said longitudinal centerline, each of said grooves being narrow enough and deep enough such that during the slush molding, the plastisol received therein forms a single thickness eyelet stay.

* * * * *